United States Patent
Frazier et al.

(10) Patent No.: US 7,260,849 B1
(45) Date of Patent: Aug. 21, 2007

(54) PROVIDING SECURITY IN A DATABASE SYSTEM

(75) Inventors: John D. Frazier, Romona, CA (US); Michael L. Reed, San Diego, CA (US)

(73) Assignee: NCR Corporation, Dayton, OH (US)

(*) Notice: Subject to any disclaimer, the term of this patent is extended or adjusted under 35 U.S.C. 154(b) by 1125 days.

(21) Appl. No.: 09/897,628

(22) Filed: Jul. 2, 2001

(51) Int. Cl.
*G06F 21/00* (2006.01)

(52) U.S. Cl. .................................... 726/28
(58) Field of Classification Search ............. 707/9; 713/200; 709/226
See application file for complete search history.

(56) References Cited

U.S. PATENT DOCUMENTS 6,202,066 B1* 3/2001 Barkley et al. ............... 707/9

* cited by examiner

*Primary Examiner*—Kambiz Zand
*Assistant Examiner*—Andrew L Nalven
(74) *Attorney, Agent, or Firm*—John D. Cowart; Harden E. Stevens, III

(57) ABSTRACT

A method and apparatus to provide security for data in a database system includes providing a secure user-defined data type (UDT) that has security features. The secure UDT defines security information, which in one arrangement is in the form of a list of identifiers of authorized users or other entities. Each data instance according to the secure UDT stored in tables of the database system is associated with such an access list. Thus, in response to a query, the security information is accessed to determine whether the user or other entity that issued the query has rights to access the data. Access is then allowed or denied based on the security information.

1 Claim, 4 Drawing Sheets

PROVIDING SECURITY IN A DATABASE SYSTEM

BACKGROUND

A database is a collection of stored data that is logically related and that is accessible by one or more users. A popular type of database system is the relational database management, which includes relational tables made up of rows (or tuples) and columns (or attributes). Each row represents an occurrence of an entity defined by the table, with an entity being a person, place, or thing about which the table contains information. Each column represents an attribute of the entity.

A traditional relational database management system (RDBMS) provides for relatively simple data types, such as integers, real numbers, character strings, and so forth. Object relational database systems provide for more complex data types, such as data types used to represent maps, audio data, video data, image data, multimedia data, and so forth.

In many conventional relational database management systems, security of data stored in the database system is usually implemented with a combination of techniques. For example, security is provided in some systems by restricting access to an entire database, restricting access to specific tables, or restricting access to specific "views." A "view" is a predefined subset of one or more tables. A view can be considered a window that accesses selected portions of the database. A view can be used to hide certain rows or columns of a table from a user.

Restricting access rights at the database level, table level, or view level is rather coarse, and typically does not provide for the ability to provide finer access control of portions of a database.

SUMMARY

In general, enhanced security is provided for data in a database system. For example, a method includes providing a user-defined data type, providing security information for the user-defined data type, and storing data instances according to the user-defined data type. Security information is associated with the data instances.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
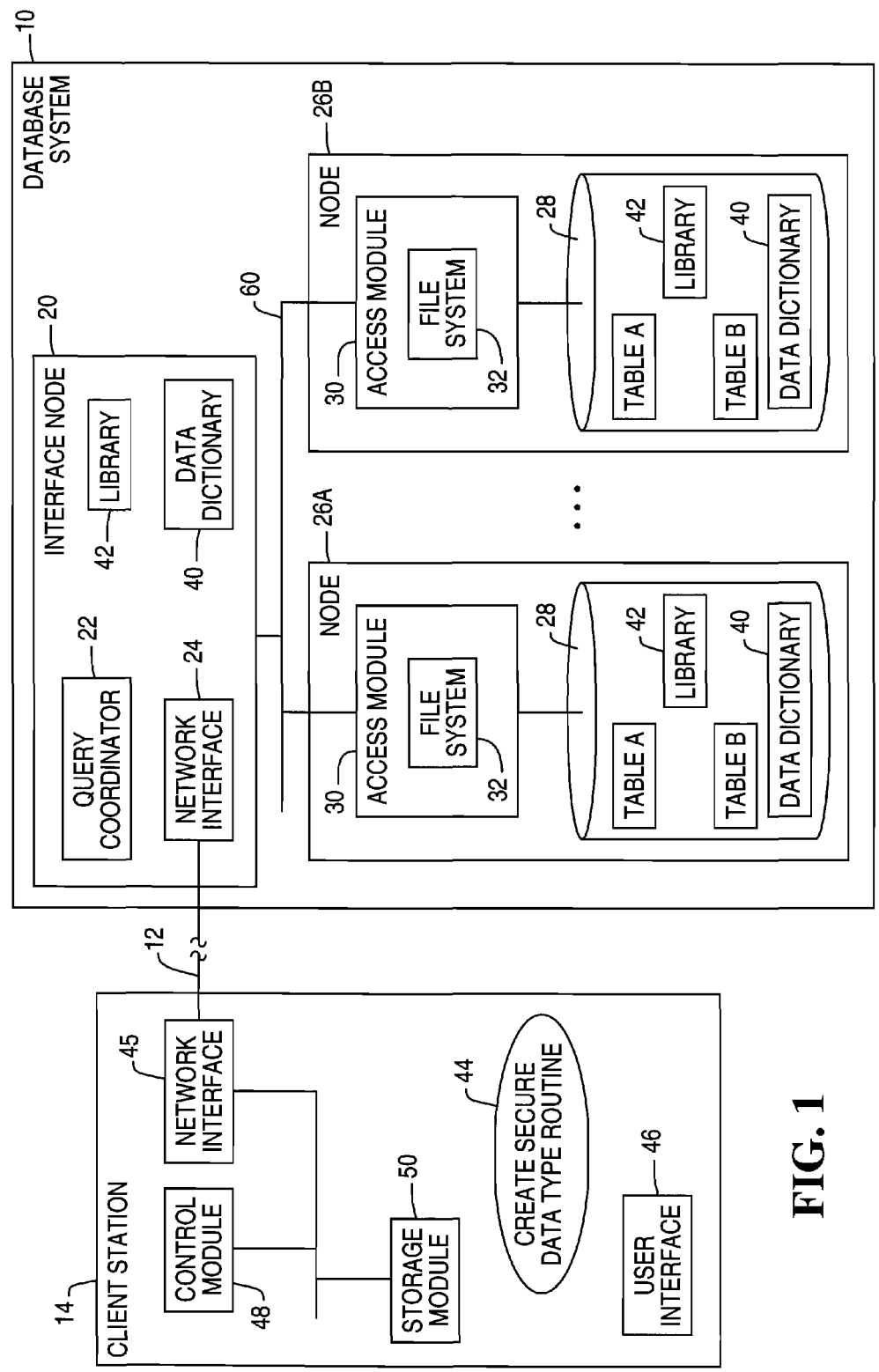
FIG. 1 is a block diagram of a database system in accordance with an embodiment.

FIG. 1 illustrates one example embodiment of a database system 10 that is coupled to a client station 14 over a data network 12. In one embodiment, the database system 10 is an object relational database management system (OR-DBMS). Examples of the data network 12 include a local area network (LAN), a wide area network (WAN), or a public network (such as the Internet).

A user at the client station 14 is able to issue requests, such as Structured Query Language (SQL) statements or other standard database-query statements, to the database system 10 to extract data and to perform other tasks in the database system 10. SQL is defined by the American National Standards Institute (ANSI), with one version being the SQL-99 Standard (also referred to as the SQL-3 Standard). SQL statements are entered through a user interface 46 in the client station 14.

SQL-99 defines several data types, including predefined data types and user-defined data types (UDTs). Examples of predefined data types include the number data type for representing numeric values, character data type for representing a strings of characters, and so forth. A characteristic of predefined SQL data types is that the inherent data structure of the data type is already defined by the SQL standard. Unlike predefined data types, which have data structures already defined by the standard database-query language, UDTs are created by a user, an application, a database management system, or by another standard (other than the database-query language standard). Although reference is made to SQL-99 in this description, other embodiments can employ other types of standard database-query languages that provide for UDTs.

In accordance with some embodiments, the database system 10 provides for "secure" data types. A "secure" data type is a UDT that defines security information relating to access rights of data instances according to the secure data type. Such data instances are stored in entries or cells of tables in the database system 10, with each entry or cell corresponding to a row and column of the table. Rows of tables are also referred to as tuples, with columns of each tuple referred to as attributes. The content of each attribute in a tuple includes a data instance. Some attributes of a tuple are according to secure data types while other attributes are according to conventional (non-secure) data types. Each data instance according to a secure data type is associated with security information that specifies users (or other entities) that are authorized to access the data instance.

A benefit offered by storing data according to secure data types is that access rights to data instances can be specified at a relatively fine level. In one embodiment, access rights can be specified for each data instance, which corresponds to the content of a given cell of a table. In other embodiments, to reduce the amount of security information that needs to be stored for each table, the security information can be associated with blocks of data (rather than with individual data instances). For example, a block of data can include a column of data, a row of data, or some predefined block of data instances in the table.

In one embodiment, statements to create the one or more secure data types in the database system 10 are issued from the client station 14. Alternatively, the statements are issued from another terminal coupled to the database system 10. According to some embodiments, a statement to create a secure data type is the SQL-99 CREATE TYPE statement. The CREATE TYPE statement names the UDT and identifies the set of valid values associated with the UDT, among other tasks. A UDT is also associated with one or more methods, which are routines or functions invoked to perform tasks with respect to data defined by the UDT. To define such methods, a CREATE METHOD statement is provided by SQL-99.

By issuing CREATE TYPE and CREATE METHOD statements, the client station 14 (or other terminal) is able to create a secure data type and associated methods for storing data in a secure manner in the database system 10. When an access request for a data instance according to a secure data type is received, the security information associated with the data instance is used to determine if the requestor (e.g., a user, an application, etc.) has access rights.

In one embodiment, the client station 14 includes a routine 44 (referred to as a "CreateSecureDataType routine") that generates CREATE TYPE and CREATE METHOD statements that are communicated to the database system 10. The CreateSecureDataType routine 44 is executable on a control module 48, which is connected to a storage module 50. The client station 14 also includes a network interface 45 coupled to the data network 12 to enable the client station 14 to communicate with the database system 10.

In one example, the CREATE TYPE and CREATE METHOD statements are generated by the CreateSecureDataType routine 44 in response to user inputs in the user interface 46. The CreateSecureDataType routine 44 communicates the CREATE TYPE and CREATE METHOD statements to the database system 10 for creating the desired secure data types. The CREATE TYPE and CREATE METHOD statements update one or more database data dictionaries so that the database system 10 is aware of the new UDT and location of the methods.

In the illustrated example embodiment, the database system 10 includes multiple nodes 26A and 26B (two or more). In an alternative embodiment, the database system 10 can be a single-node system. The nodes 26A and 26B are coupled by an interconnect network 60, which is in turn connected to an interface node 20. The interface node 20 includes a query coordinator (or parsing engine) 22 to receive queries from the client station 14, to parse the received requests, and to generate executable steps to one or more access modules 30 in corresponding nodes 26A, 26B. The interface node 20 also includes a network interface 24 that enables communications over the data network 12.

In another embodiment, instead of being in a separate interface node 20, the query coordinator or parsing engine (or plural query coordinators or parsing engines) are executable in one or more of the nodes 26A, 26B.

Each access module 30 includes a database manager that, in response to SQL queries, creates, modifies, or deletes definitions of tables; inserts, deletes, or modifies rows within the tables; retrieves information from definitions and tables; and locks databases and tables. In one example, each access module is an access module processor (AMP), which is a virtual processor implemented with software, such as AMPs used in some TERADATA® database systems from NCR Corporation. Multiple AMPs can reside on each node 26.

Each access module 30 sends input/output (I/O) requests to, and receives data from, a respective storage module 28 through a respective file system 32. Although referred to in the singular, "storage module" can refer to one or plural storage devices, such as hard disk drives, disk arrays, tape drives, and other magnetic or optical media.

Each storage module 28 includes one or more tables. In the example shown in FIG. 1, each storage module 28 includes a portion of table A and a portion of table B. In the parallel database system 10 shown in FIG. 1, each table is distributed across multiple access modules 30 (and storage modules 28) to enhance parallel processing of data in the database system 10. In addition, each node 26 is capable of storing data in tables according to one or more secure data types defined by a database data dictionary 40. The database data dictionary 40 can also be stored in the interface node 20.

A data instance according to a secure data type is associated with security information (e.g., an access list containing identifiers of authorized users and other entities) that defines access rights to the data instance, which is stored in a table (table A or B). Whenever a data instance in a table is accessed by a requester, the respective access module 30 checks the security information associated with the data instance to determine if the requester has access rights to the data instance.

As also noted above, one or more methods (stored in a library 42) are associated with each of the secure data types. Examples of such methods include methods to add, delete, and modify permissions of each data instance. Other types of methods can also be defined.

Figure 2:
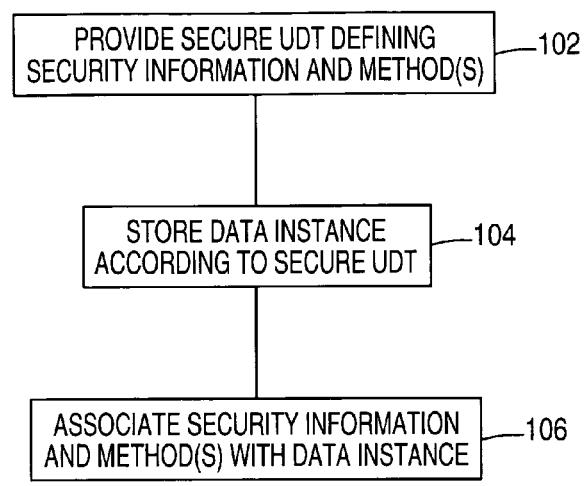
FIG. 2 is a flow diagram that illustrates a general process of providing a secure user-defined data type and storing data instances according to the secure user-defined data type in the database system of FIG. 1.

Thus, generally, as shown in FIG. 2, a secure UDT is provided (at 102) in the database system 10. The secure UDT defines security information (in the form of an access list) as well as one or more methods to process data according to the secure UDT. Data instances according to the secure UDT are stored (at 104) in tables in the database system 10. The security information and methods defined by the secure UDT are associated (at 106) with the data instances to enable secure storage of sensitive information.

Figure 3:
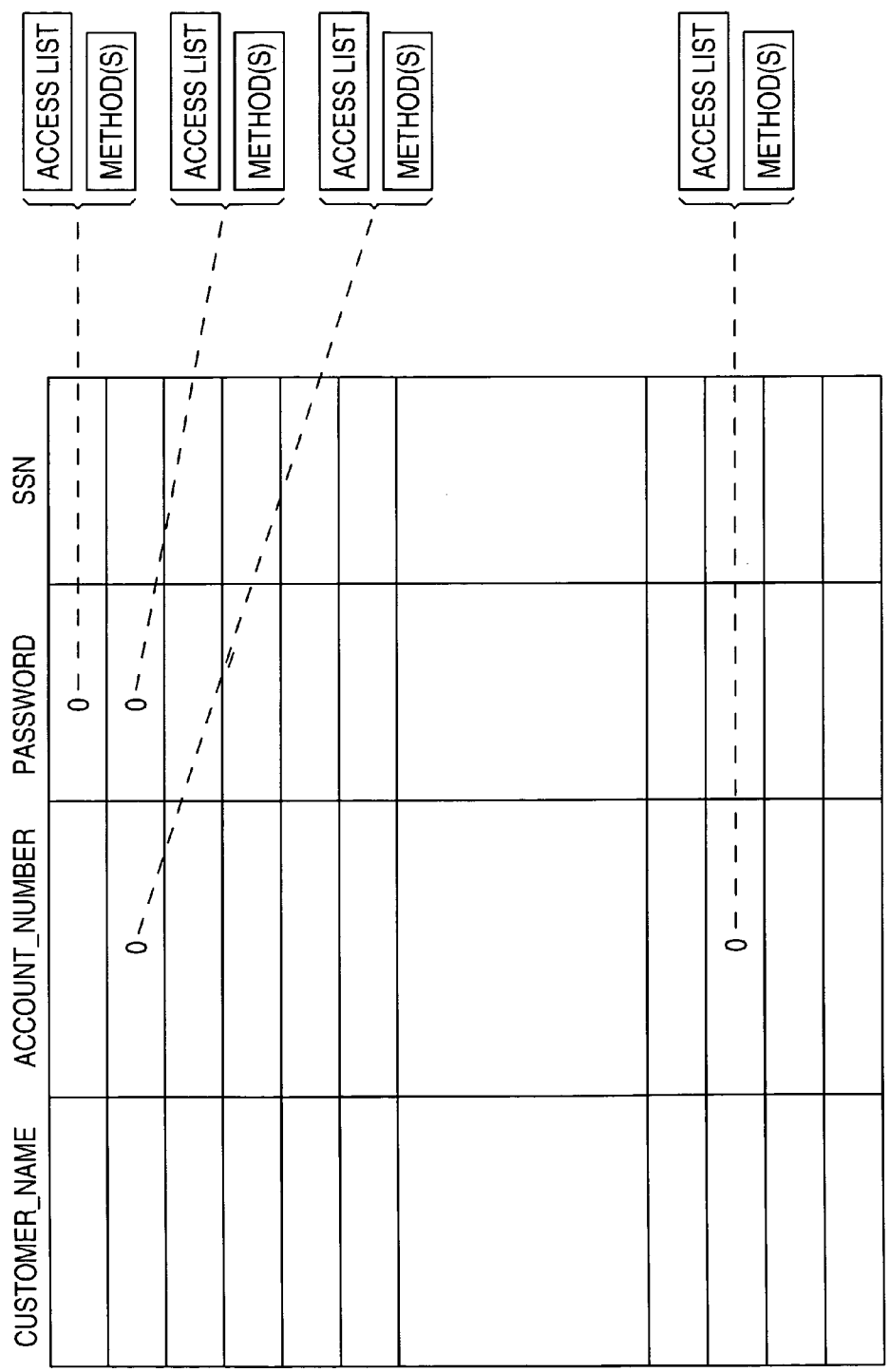
FIG. 3 illustrates an example table having columns that contain data according to secure data types that are associated with security information relating to access rights to data.

FIG. 3 shows an example table in the parallel database system 10. The example table includes various rows and columns, with a column containing customer names (CUSTOMER_NAME); a column containing account numbers (ACCOUNT_NUMBER) associated with respective customers; a column containing passwords (PASSWORD) associated with respective customers; and a column containing social security numbers (SSN) for respective customers. In the example, the data type for the CUSTOMER_NAME column (also referred to as an attribute) is a character data type, which is a data type that is not associated with security information. However, due to the sensitive nature of data contained in the ACCOUNT_NUMBER, PASSWORD, and SSN columns, the data types for those columns are secure data types. For example, a SECURE_ACCTNR data type is defined to store data in the ACCOUNT_NUMBER column, a SECURE_INT data type is defined to store data in the PASSWORD column, and a SECURE_ID data type is defined for storing data in the SSN column.

The SECURE_INT data type is based on the regular integer data type, except security features are added to enable each data instance in the PASSWORD column to be associated with security information (e.g., an access list). The security information also includes methods to provide security functions. The SECURE_ID data type can itself be based on the SECURE_INT data type, with more features (e.g., more methods) defined. In another embodiment, the PASSWORD and SSN columns can be according to the same secure data type. The SECURE_ACCTNR data type can also be based on the regular integer data type, except security features are added.

In the example of FIG. 3, each data instance stored in a cell of the PASSWORD column is associated with its own security information and one or more methods that are defined by the SECURE_INT data type. Similarly, in the ACCOUNT_NUMBER column, security information and method(s) defined by the SECURE_ACCTNR data type are associated with data instances in the column.

Figure 4:
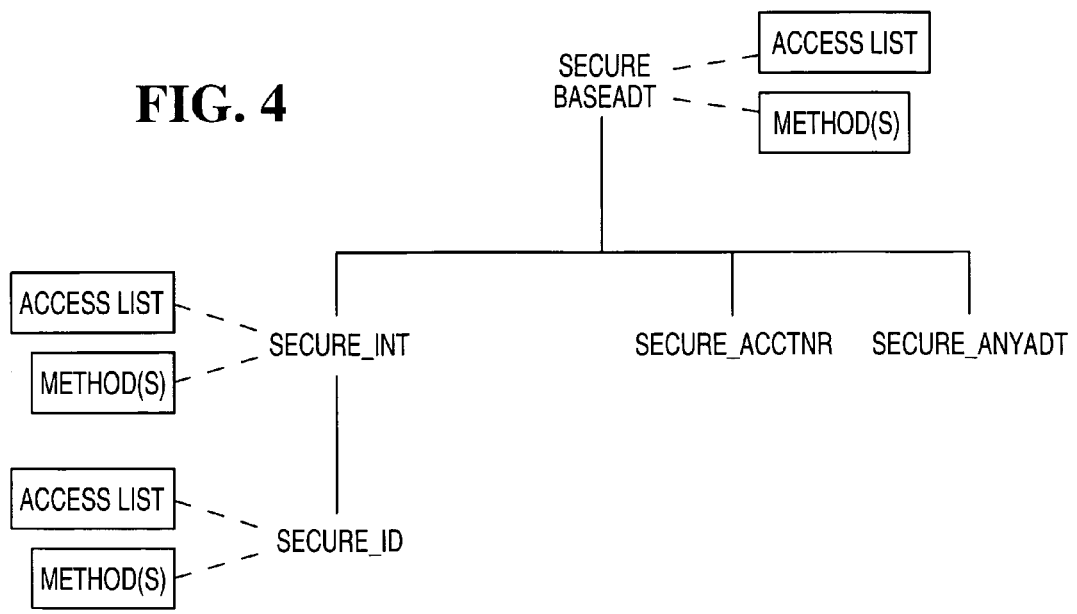
FIG. 4 illustrates a tree structure of example secure data types.

FIG. 4 shows an example tree structure of secure data types. The base secure data type is a SecureBaseADT data type, which other secure data types can be based on. Other data types are built upon the SecureBaseADT using inheritance techniques provided by the object relational database management system 10 for both methods and data. Thus, in the example of FIG. 4, several data types are built upon the SecureBaseADT data type.

Two of the secure data types that are built upon SecureBaseADT are the SECURE_INT data type and the SECURE_ID data type. Another example secure data type is the SECURE_ACCTNR data type, which represents a data type to store account numbers for customers. Yet another secure data type is a SECURE_ANYADT data type, which represents a more generic secure data type for other data.

The data types shown in FIG. 4 are provided as examples only, as other secure data types can be used for other purposes. The definition of multiple data types provides the flexibility of handling different types of data. For example, different sets of methods can be defined for each data type to provide convenient manipulation of data according to that data type. Thus, the SECURE_ACCTNR data type is associated with methods for processing account numbers, while the SECURE_ID data type is associated with methods for processing social security numbers.

In the example shown in FIG. 4, each data instance according to the SecureBaseADT is associated with an access list that grants permissions to one or more users or a group of users. The access list contains user identifiers (USER_IDs) to identify specific users, and group identifiers (GROUP_IDs) to identify specific groups of users. Also, each data instance according to the SecureBaseADT data type is associated with several methods: Add_User (object, USER_ID), Delete_User (object, USER_ID), Add_Group (object, Group_ID), Delete_Group (object, Group_ID), Read_Secure (object, USER_ID, GROUP_ID), and Write_Secure (object, USER_ID, GROUP_ID). The Add_User( ) method adds user identifiers to the access list for each data instance, the Delete_User( ) method deletes user identifiers from the access list, the Add_Group( ) method adds a group identifier to the access list, and the Delete_Group( ) method deletes a group identifier from the access list. The Read_Secure( ) method is executed to retrieve data instances according to a secure data type from a table, and the Write_Secure( ) method is executed to write data instances according to a secure data type to a table.

The SECURE_INT data type is built upon the SecureBaseADT data type. Each data instance of the SECURE_INT data type is associated with an access list (defined by the SecureBaseADT data type). In addition, each data instance according to the SECURE_INT data type is associated with the same methods defined by the SecureBaseADT data type, including the Add_User( ) method, the Delete_User( ) method, the Add_Group( ) method, the Delete_Group( ) method, the Read_Secure( ) method, and the Write_Secure( ) method. Further, each data instance according to the SECURE_INT data type is associated with one or more other methods that are defined for processing secure integer numbers.

The SECURE_ID data type is built upon the SECURE_INT data type. As a result, each data instance according to the SECURE_ID data type is associated with an access list defined by the SecureBaseADT data type, and with the methods defined by the SecureBaseADT data type and the Secure_INT data type. Additionally, the SECURE_ID data type also defines other methods that are specific to processing social security numbers.

The Secure_ACCTNR and Secure_ANYADT data types, which are based on the SecureBaseADT data type, similarly are each associated with the SecureBaseADT access list and ADT methods, as well as with other methods.

In one embodiment, data structures defined for passing parameters to methods of the various data types is as follows: USER_ID, which is used to specify a given user; GROUP_ID, which is used to define a group of users; USERLIST, which is an array of USER_IDs used to define plural users; and GROUPLIST, which is an array of GROUP_IDs used to define plural groups.

In one example embodiment, definition of a secure data type can be accomplished by using the C++ "Class" statement. One or more Class statements are part of the library files 52 stored in the storage module 50 in the client station 14 (FIG. 1). For example, the SECURE_INT data type is defined using the following statement:

```
Class SECURE_INT from SecureBaseADT, INT {
    Get_Value( );
    Set_Value( );
    Equal( );
    NotEqual( );
    LessThan ( );
    GreaterThan( );
    .
    .
    .
}
```

The SECURE_INT data type is inherited from both the SecureBaseADT data type and the INT data type. Thus, the SECURE_INT data type inherits data structures associated with a conventional integer data type, and also inherits data structures and methods defined by the SecureBaseADT UDT. In addition, the SECURE_INT data type defines the following additional methods in the example above: Get_Value( ), to retrieve the value of a secure integer variable according to the SECURE_INT data type; Set_Value( ), to set the value of a secure integer variable; Equal( ), to perform an equality comparison; NotEqual( ), to perform an inequality comparison; LessThan( ), to perform a less than comparison; and GreaterThan( ), to perform a greater than comparison.

As another example, the SECURE_ID data type is defined as follows:

```
Class SECURE_ID from SECURE_INT {
    Get_ID( );
    Set_ID( );
    Encrypt( );
```

```
            -continued

Decrypt( );
               .
               .
               .
         }
```

The SECURE_ID data type is inherited from the SECURE_INT data type, and thus inherits all data structures and methods associated with the SECURE_INT data type. In addition, the SECURE_ID data type defines a Get_ID( ) method to retrieve an identifier value; a Set_ID method to get an identifier value; an Encrypt( ) method to encrypt an identifier to protect the identifier; and a Decrypt( ) method to decrypt an encrypted identifier.

Figure 5:
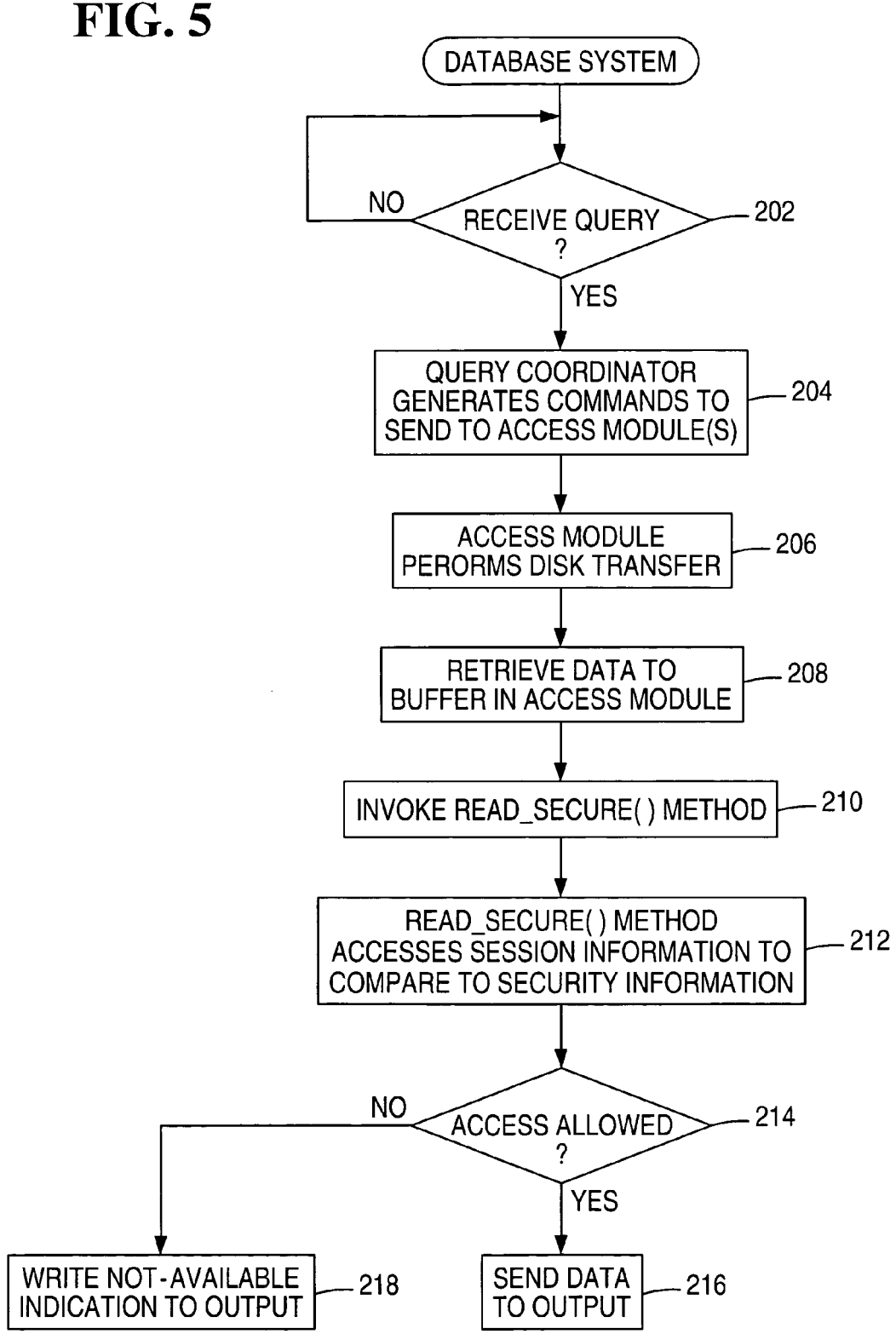
FIG. 5 is a flow diagram of a process of accessing data according to a secure data type.

FIG. 5 shows a database access operation performed within the database system 10. The query coordinator 22 first determines (at 202) if a query has been received. If so, the query coordinator parses the received query and generates (at 204) executable steps that are sent to one or more the access modules 30 to perform the requested operation. In the example shown in FIG. 5, a read operation is illustrated. A similar process can be performed for update operations.

In response to receipt of the executable steps from the query coordinator 22, each access module 30 performs a disk access of its corresponding storage module 28. Data is retrieved (at 208) by each access module 30 and placed into a memory buffer in the access module 30. The access module 30 then invokes (at 210) the Read_Secure( ) method to perform a secure read of the data in the memory buffer. For a write operation, the Write_Secure( ) method is invoked. The Read_Secure( ) method accesses (at 212) session information that is stored by the access module 30. The session information includes a user identifier to identify the user that issued the query. In one example embodiment, to access data in the database system 10, a user first logs onto the database system 10. As a result, in a given session, the identity of the user is known and is maintained as part of the session information. The user identifier retrieved from the session information is compared to the security information associated with the data instance retrieved to the memory buffer from the storage module 28.

The access module 30 determines (at 214) if access of the data instance is allowed based on the comparison. If access is allowed, then the access module 30 sends the retrieved data to the output (which is communicated back to the client station 14 or some other terminal). However, if access is denied, then a not-available indication is written to the output.

The systems discussed above (client station and database system) include various software routines or modules (including the CreateSecureDataType routine 44, software associated with the access modules 32, methods associated with the secure data types, and so forth). Such software routines or modules are executable on corresponding control modules. The control modules include microprocessors, microcontrollers, or other control or computing devices. As used here, a "controller" or "processor" refers to a hardware component, software component, or a combination of the two. A "controller" or "processor" can also refer to plural hardware components, software components, or a combination of hardware components and software components.

The storage modules referred to in this discussion include one or more machine-readable storage media for storing data and instructions. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; or optical media such as compact disks (CDs) or digital video disks (DVDs). Instructions that make up the various software routines or modules in the various systems are stored in respective storage modules. The instructions when executed by a respective control module cause the corresponding system to perform programmed acts.

The instructions of the software routines or modules are loaded or transported to each system in one of many different ways. For example, code segments including instructions stored on floppy disks, CD or DVD media, a hard disk, or transported through a network interface card, modem, or other interface device are loaded into the system and executed as corresponding software routines or modules. In the loading or transport process, data signals that are embodied in carrier waves (transmitted over telephone lines, network lines, wireless links, cables, and the like) communicate the code segments, including instructions, to the system. Such carrier waves are in the form of electrical, optical, acoustical, electromagnetic, or other types of signals.

While the present invention has been described with respect to a limited number of embodiments, those skilled in the art will appreciate numerous modifications and variations therefrom. It is intended that the appended claims cover such modifications and variations as fall within the true spirit and scope of this present invention.

What is claimed is:

1. A database system comprising:
   one or more storage modules to store data instances according to a secure user-defined data type, the secure user-defined data type defining security information and one or more security functions; and
   a controller adapted to receive a Structured Query Language query originated by a source for one of the data instances, the controller adapted to determine if the source is authorized to access the one data instance based on the security information,
   the controller adapted to further invoke the one or more security functions to process the one data instance.

* * * * *